(12) United States Patent
Kelsey et al.

(10) Patent No.: US 7,196,159 B2
(45) Date of Patent: Mar. 27, 2007

(54) PROCESS FOR PRODUCING POLYTRIMETHYLENE TEREPHTHALATE

(75) Inventors: Donald Ross Kelsey, Guerneville, CA (US); Cecilia Zuqi Tse, Katy, TX (US); Emery Don Johnson, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/239,858

(22) Filed: Sep. 30, 2005

(65) Prior Publication Data

US 2006/0084781 A1    Apr. 20, 2006

(51) Int. Cl.
*C08G 63/02* (2006.01)
(52) U.S. Cl. ............... 528/279; 524/745; 528/275; 528/293; 528/302; 528/308; 528/308.5
(58) Field of Classification Search ........ 528/275, 528/293, 302, 308, 308.6, 279; 524/745
See application file for complete search history.

(56) References Cited

U.S. PATENT DOCUMENTS

| | | | |
|---|---|---|---|
| 5,340,909 A | 8/1994 | Doerr et al. | 582/276 |
| 6,180,756 B1 * | 1/2001 | Burch | 528/486 |
| 6,403,762 B1 | 6/2002 | Duh | 528/503 |
| 6,509,438 B2 | 1/2003 | Kelsey et al. | 528/279 |
| 6,608,168 B1 | 8/2003 | Ng | 528/272 |
| 2002/0009353 A1 | 1/2002 | Kelsey et al. | 412/40 |
| 2003/0050429 A1 | 3/2003 | Kato et al. | 528/272 |
| 2003/0065105 A1 | 4/2003 | Kato et al. | 525/418 |

FOREIGN PATENT DOCUMENTS

| | | |
|---|---|---|
| EP | 1571171 A1 | 1/2004 |
| JP | 51-142097 | 12/1976 |
| WO | 98/23662 | 6/1998 |
| WO | 01/81447 A2 | 11/2001 |
| WO | 02/08310 A2 | 1/2002 |
| WO | 2004/065451 A1 | 8/2004 |

OTHER PUBLICATIONS

International Search Report for PCT/US2005/035464 of Mar. 29, 2006.
Written Opinion for PCT/US2005/035464 of Mar. 29, 2006.

* cited by examiner

*Primary Examiner*—Terressa Boykin
(74) *Attorney, Agent, or Firm*—Richard B. Taylor

(57) ABSTRACT

A process for the production of polytrimethylene terephthalate (PTT), wherein the process comprises:
(i) one or more esterification steps, wherein terephthalic acid (TPA) or an alkyl diester of terephthalic acid is reacted with 1,3-propanediol (PDO); and
(ii) one or more subsequent polycondensation steps,
wherein the process further comprises the addition of a protic acid, other than terephthalic or isophthalic acid, before and/or during the one or more esterification steps, wherein the protic acid has a dissociation constant of at most 4 ($pK_a$ measured in water at 25° C.), and wherein the total amount of protic acid added before and/or during the one or more esterification steps is in the range of from 0.001 to 10 millimole of acid per kilogram of polytrimethylene terephthalate produced.

22 Claims, No Drawings

PROCESS FOR PRODUCING POLYTRIMETHYLENE TEREPHTHALATE

FIELD OF THE INVENTION

The present invention relates to a process for producing polytrimethylene terephthalate.

BACKGROUND OF THE INVENTION

Polytrimethylene terephthalate (PTT) is primarily a linear aromatic polyester which can be prepared from the esterification and condensation polymerization of 1,3-propanediol (PDO) and terephthalic acid (TPA) or 1,3-propanediol and alkyl diesters of terephthalic acid. Polytrimethylene terephthalate is currently used in carpet fibre and textile fibre applications. For such commercial applications, it is desired to produce polytrimethylene terephthalate which has good spinning behaviour, dyeability and colour stability. It is also desired to produce polytrimethylene terephthalate which has low tendency to generate acrolein when the polymer is heated in air, as it commonly is during downstream processing such as spinning into fibres. It is known that this instability can be controlled with additives such as hindered phenols such as described in WO98/23662.

The tendency of polytrimethylene terephthalate to produce acrolein when heated and other final properties of the PTT polymer are related to the amount of dipropylene glycol (DPG) monomer units produced in the polymer during polymerization.

Dipropylene glycol (DPG) is used herein to mean the residual unit [—OCH$_2$CH$_2$CH$_2$OCH$_2$CH$_2$CH$_2$O—] in the polymer chain. The following formula shows how the DPG units are copolymerized into the polymer to form a random copolyester (and how some end groups, such as allyl, carboxyl, methyl ester, may be incorporated):

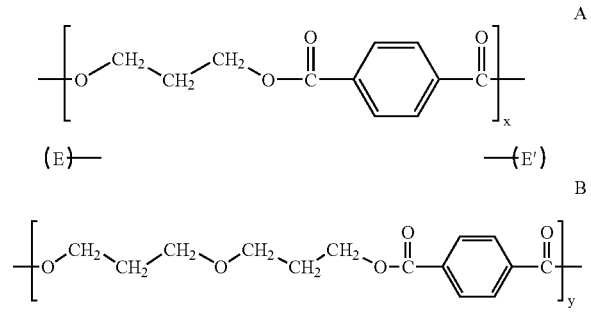

comprising units A and B connected randomly to each other by ester bonds and wherein E is an endgroup attached to the diol end and consisting of either H or the residuum of a hindered phenol (defined herein), E' is an endgroup attached to the carboxyl end and consisting of a PDO [—OCH$_2$CH$_2$CH$_2$OH], a DPG [—OCH$_2$CH$_2$CH$_2$OCH$_2$CH$_2$CH$_2$OH], an allyl [—OCH$_2$CH=CH$_2$] group, a hydroxy [—OH] or, in the case when alkyl diesters of terephthalic acid are used, an alkoxy [—OR] group, such as methoxy [—OCH$_3$], and where the average (or overall) molar proportion of DPG comonomer units to the total diol units, including endgroups, is the ratio of the sum of y+E' (where E' is the DPG endgroups only) to the sum of x+y+E' (where E' is the diol endgroups, including allyl, but excluding the hydroxy and alkoxy endgroups) and is in the range of from about 0.001 to about 0.05. The average degree of polymerization is x+y and is greater than 50 and preferably greater than 80, typically greater than 100. The average number of endgroups E+E' is 2 or less relative to x+y.

The amount of dipropylene glycol comonomer units present in polytrimethylene terephthalate has a noticeable effect on the final properties of the polymer. The level of DPG comonomer units present in the PTT polymer affects the polymerisation and the crystallinity of the polymer and thus the melting point. Therefore the level of DPG comonomer units present in the final PTT polymer will have an effect on the properties of the PTT during further processing, such as spinning and/or dyeing of PTT fibers. If the level of DPG comonomer units present in the PTT polymer is too low, this results in poor dyeability of the product and if the level is too high, this can result in excessive levels of acrolein being produced upon heating of the PTT in air. Therefore, accurate control of the amount of dipropylene glycol comonomer units in the final polytrimethylene terephthalate product is desired. Unfortunately, however, the linear isomer dipropylene glycol is not a commercially available product, and therefore the level of dipropylene glycol comonomer units present in polytrimethylene terephthalate cannot be controlled by separate addition of DPG. The level of DPG comonomer units in the final PTT polymer therefore has to be controlled by the process of production of PTT.

Various methods are known in the art for the production of PTT. Each of these methods give varying levels of DPG comonomer units in the final PTT polymer.

PTT made by the solid state polymerization process described in U.S. Pat. No. 6,403,762 (which comprises esterification of 1,3-propanediol (PDO) and terephthalic acid (TPA) to form an esterification product followed by polycondensation of the esterification product to form a prepolymer which is solid state polymerized to produce a polymer with the desired intrinsic viscosity), comprises a significant amount (from about 1.8 to about 3.0 mole %) of DPG comonomer units. The PTT polymer produced by this process has good properties for subsequent processing of the polymer, such as dyeability of the fiber, but has a tendency to produce acrolein when heated in air.

PTT made by the so-called "all melt process", such as that described in U.S. Pat. No. 6,509,438 (which comprises esterification of 1,3-propanediol (PDO) and terephthalic acid (TPA) followed by a prepolymerization and a final polycondensation step to obtain a PTT polymer of desired intrinsic viscosity), comprises lower amounts of DPG comonomer units (from about 0.6 to about 2.0 mole %) than PTT made by the above mentioned solid state polymerization process. The PTT polymer produced by the "all melt process" has a lower tendency to generate acrolein on heating in air, but dyeing and spinning properties of the fibre can be affected.

PTT made by processes involving transesterification of 1,3-propanediol and dimethyl terephthalate (DMT), such as described in JP-A-51-142097 or U.S. Pat. No. 5,340,909, although oxidatively stable, comprises very low amounts of DPG comonomer units (from about 0.05 to about 0.5 mole %), which although produce low levels of acrolein on heating in air, can cause difficulties with the dyeing and the spinning properties of the PTT fibre.

Since customers have specific requirements for PTT and require polymers with consistent properties, it would be highly desirable to be able control the amount of dipropylene glycol comonomer units present in polytrimethylene terephthalate. The ability to control the amount of DPG comonomer units in the manufacture of PTT would not only ensure that the polymer produced would have a consistent amount of DPG comonomer units, and thus consistent properties, but would also enable the tailoring of the DPG comonomer unit content of the PTT, and thus the final properties of the PTT, to meet various customer requirements.

SUMMARY OF THE INVENTION

In one embodiment, the invention is directed to a process for the production of polytrimethylene terephthalate (PTT) having controlled levels of dipropylene glycol, comprising:

(i) contacting 1,3-propanediol with terephthalic acid or an alkyl diester of terephthalic acid in the presence of a protic acid other than terephthalic acid or isophthalic acid having a dissociation constant (pKa) of at most 4, as measured in water at 25° C., to produce an esterification product in one or more esterification steps;

(ii) polycondensing the esterification product to form polytrimethylene terephthate;

wherein the protic acid is present in the one or more esterification steps in an amount of from 0.001 to 10 millimole of protic acid per kilogram of polytrimethylene terephthalate produced.

Another embodiment of the invention is directed to a process for the production of polytrimethylene terephthalate (PTT) having a controlled level of dipropylene glycol, comprising:

(i) contacting a protic acid other than terephthalic acid or isophthalic acid having a dissociation constant (pKa) of at most 4, as measured in water at 25° C., with 1,3-propanediol to form a mixture of 1,3-propanediol and dipropylene glycol;

(ii) contacting the mixture of 1,3-propanediol and dipropylene glycol prepared in step (i) with terephthalic acid and/or an alkyl diester of terephthalic acid to produce an esterification product in one or more esterification steps; and (iii) polycondensing the esterification product to form polytrimethylene terephthalate;

wherein the protic acid is present in an amount of from 0.001 to 10 millimole equivalents of acid groups per kilogram of polytrimethylene terephthalate produced.

Still another embodiment of the present invention is directed to a process for the production of polytrimethylene terephthalate (PTT) having controlled levels of dipropylene glycol, comprising:

(i) contacting 1,3-propanediol with an alkyl diester of terephthalic acid in the presence terephthalic acid to produce an esterification product in one or more esterification steps; and (ii) polycondensing the esterification product to form polytrimethylene terephthate;

wherein the terephthalic acid is present in the one or more esterification steps in an amount of from 0.01 to 1000 millimole equivalents of acid groups per kilogram of polytrimethylene terephthalate produced.

DETAILED DESCRIPTION OF THE INVENTION

A first aspect of the present invention relates to a process for the production of polytrimethylene terephthalate (PTT), wherein the process comprises:

(i) one or more esterification steps, wherein terephthalic acid (TPA) or an alkyl diester of terephthalic acid is reacted with 1,3-propanediol (PDO); and (ii) one or more subsequent polycondensation steps, wherein the process further comprises the addition of a protic acid, other than terephthalic or isophthalic acid, before and/or during the one or more esterification steps, wherein the protic acid has a dissociation constant of at most 4 ($pK_a$ measured in water at 25° C.), and wherein the total amount of protic acid added before and/or during the one or more esterification steps is in the range of from 0.001 to 10 millimole of acid per kilogram of polytrimethylene terephthalate produced. The addition of a small quantity of protic acid before and/or during the esterification stage in the process for producing polytrimethylene terephthalate (PTT) has the effect of controlling the dipropylene glycol (DPG) comonomer unit content in the final PTT polymer.

The terephthalic acid or the dialkyl ester of terephthalic acid monomer feed component of the process of the present invention optionally may also comprise other diacid or dialkyl ester components, such as isophthalic acid or dialkyl esters of isophthalic acid, which may be used to modify the final properties of the PTT. These optional diacid or dialkyl ester components may be incorporated into the PTT polymer at a level of less than 10 mole % based upon the total amount of terephthalic acid or the dialkyl ester of terephthalic acid, typically 1–2 mole %.

The 1,3-propanediol monomer feed component of the process of the present invention optionally may also comprise other diol components (such as ethylene glycol, diethylene glycol, 1,4-cyclohexane dimethanol and 1,4-butanediol) which may be used to modify the final properties of the PTT. These optional diol components may be incorporated into the PTT polymer at a level of less than 10 mole % based upon the total amount of 1,3-propanediol, typically 1–2 mole %.

The term "polycondensation" as used herein includes any subsequent polycondensation or polymerization steps performed on the product of the one or more esterification steps, such as prepolymerization of the esterification product to form a prepolymer and polymerization/polycondensation of the prepolymer to produce PTT. Although solid state polymerisation is a polycondensation reaction, the term "polycondensation" as used herein excludes solid state polymerisation steps. However, the process of the present invention may be used in methods of producing PTT which optionally comprise a subsequent solid state polymerization step (e.g. the "TPA PTT process" described hereinbelow).

By the term "controlling the dipropylene glycol comonomer unit content" as used herein is meant increasing the amount of dipropylene glycol monomer units present in the polytrimethylene terephthalate polymer from the level that would have been present had the small quantity of protic acid not been added to the process of production of polytrimethylene terephthalate.

Protic acids suitable for use in the process of the present invention are any protic acids, other than terephthalic or isophthalic acid, which have a dissociation constant of at most 4 ($pK_a$ measured in water at 25° C.). Preferably the protic acid is a non-oxidising, non-nucleophilic protic acid with a dissociation constant of at most 4 (pK$_a$ measured in water at 25° C.) and which does not result in the degradation of monomer or polymer units or the generation of unwanted by-products.

By the term "non-oxidising" as used herein is meant that the protic acid will not oxidise the monomer units or polymer units of the polytrimethylene terephthalate, and which will also not oxidise or corrode the process equipment in which it will be employed.

By the term "non-nucleophilic" as used herein is meant that the conjugate base of the protic acid will not exhibit nucleophilic behaviour under the reaction conditions in which it is to be used. Nucleophilic protic acids will tend to form stable esters with the 1,3-propanediol and would therefore be consumed during the reaction.

Monofunctional protic acids which can react with hydroxy groups to form stable esters can be used in the process described herein but are preferably not used in concentrations higher than 0.01 equivalents of protic acid based on the total acid (including any terephthalic or isophthalic acid used as a monomer feed component) since they can act as chain terminators, which may limit the molecular weight or alter other properties of the PTT.

Difunctional protic acids may be employed, although the difunctional protic acid may become incorporated into the final PTT polymer as a comonomer unit. Examples of suitable difunctional protic acids include 2-sulfo-1,4-benzenedicarboxylic acid, 5-sulfo-1,3-benzenedicarboxylic acid and the like.

By the term "which does not result in the degradation of the monomer or polymer units or the generation of unwanted by-products" as used herein is meant that the protic acid will not cause reactions, other than the polymerisation reactions of the 1,3-propanediol and the terephthalic acid or alkyl diesters of terephthalic acid, which will result in the degradation of the monomer units of the PTT (i.e. 1,3-propanediol and terephthalic acid or alkyl diesters of terephthalic acid), and/or of polymer units of PTT, or the formation of any other species which is not any of the starting compounds or is not a species produced as a direct result of the polymerisation reaction which forms the PTT. Examples of protic acids which may cause degradation of the monomer units and/or polymer units of the PTT include nitric acid and sulphuric acid. The use of acids which contain certain nitrogen or phenolic groups or moieties (e.g. nitric acid, p-hydroxybenzoic acid, picric acid, and the like) are also not preferred since they may cause colour bodies or other unwanted by-products in the final polytrimethylene terephthalate product.

Preferably, the protic acid will be relatively non-volatile, i.e. not volatile under the reaction conditions which are to be employed in the process of the present invention.

The protic acid should preferably also be compatible with the process equipment in which it is to be used, i.e. it should not react with or cause corrosion or other damage to the process equipment. Examples of protic acids which may not be compatible with the process equipment include hydrogen chloride, hydrogen bromide and hydrogen fluoride.

The dissociation constant of the protic acid of the present invention should be at most 4 (pK$_a$ measured in water at 25° C.). As used herein, the term pK$_a$ is the negative logarithm of the equilibrium constant K$_a$, i.e. pK$_a$=–log K$_a$, wherein for any acid HA which partially dissociates in solution, the equilibrium HA=H$^+$+A$^-$ is defined by an equilibrium constant K$_a$, where $$K_a = \frac{[H^+][A^-]}{[HA]}$$

In a preferred embodiment of the invention, particularly when the polytrimethylene terephthalate polymer is produced from 1,3-propanediol and terephthalic acid, the dissociation constant of the protic acid is less than 2.8 (pK$_a$ measured in water at 25° C.) (i.e. the dissociation constant of terephthalic acid (pK$_{a1}$ 2.8 measured in water at 25° C.)).

More preferably, the dissociation constant of the protic acid is at most 2 (pK$_a$ measured in water at 25° C.), even more preferably at most 1 (pK$_a$ measured in water at 25° C.), most preferably at most 0 (pK$_a$ measured in water at 25° C.), especially at most –2 (pK$_a$ measured in water at 25° C.).

Preferred types of protic acid for use in the process of the present invention are organosulfonic acids and carboxylic acids, especially organosulfonic acids. When carboxylic acids are used in the embodiment of the invention wherein the polytrimethylene terephthalate polymer is produced from 1,3-propanediol and alkyl diesters of terephthalic acid, the carboxylic acid can be a difunctional carboxylic acid, such as terephthalic acid, isophthalic acid and the like.

Examples of suitable protic acids for use in the process of the present invention include 2-sulfo-1,4-benzenedicarboxylic acid, 5-sulfo-1,3-benzenedicarboxylic acid, p-toluenesulfonic acid, benzenesulfonic acid, 4-ethylbenzenesulfonic acid, dodecylbenzenesulfonic acid, p-xylene-2-sulfonic acid, 2-mesitylenesulfonic acid, naphthylsulfonic acid, methanesulfonic acid, trifluoromethansulfonic acid, ethanesulfonic acid, perfluorooctanesulfonic acid, octane-2-sulfonic acid, 1,2-ethanedisulfonic acid, 1,3-propanedisulfonic acid, 1,-naphthalenedisulfonic acid, poly(4-styrenesulfonic acid) and mixtures thereof.

Mixtures of more than one protic acid are also suitable for use in the process of the present invention.

The amount of protic acid required in the process of the present invention will vary depending upon the process for producing PTT used and the desired amount of dipropylene glycol comonomer units present in the final PTT product. Typically, the total amount of the protic acid added to the one or more esterification steps (including both protic acid added before the one or more esterification steps and protic acid added during the one or more esterification steps) is in the range of from 0.001 to 10 millimole equivalents of acid per kilogram of polytrimethylene terephthalate produced. Preferably, the amount of the protic acid added to the one or more esterification steps is in the range of from 0.001 to 5 millimole, more preferably from 0.005 to 5 millimole and most preferably from 0.005 to 2 millimole of acid per kilogram of polytrimethylene terephthalate produced.

However, when terephthalic or isophthalic acid is used as the protic acid in the process for the production of polytrimethylene terephthalate comprising one or more esterification steps, wherein an alkyl diester of terephthalic acid is reacted with 1,3-propanediol, and one or more subsequent polycondensation steps, the total amount of the terephthalic or isophthalic acid added to the one or more esterification steps (i.e. the total amount added before and during the one or more esterification steps) is in the range of from 0.01 to 1000 millimole equivalents of acid per kilogram of polytrimethylene terephthalate produced, preferably from 0.1 to 500 millimole equivalents of acid per kilogram of polytrimethylene terephthalate produced.

The protic acid added during the process of the present invention is present in the final polytrimethylene terephthalate product in sufficiently low concentrations that it would be unlikely to affect the properties of the final PTT product, thus the neutralisation of the protic acid is not essential. However, in one embodiment of the present invention the protic acid is neutralised by the addition of an equivalent small quantity of a suitable base. Preferably, the protic acid present in the final PTT product is not neutralised.

The process of the present invention can be applied to any known method in the art for manufacturing PTT. Such methods include: esterification of 1,3-propanediol (PDO) and terephthalic acid (TPA) or an alkyl diester of terephthalic acid to form an esterification product, followed by polycondensation of the esterification product to form a prepolymer which is solid state polymerised to produce the final PTT product having the desired intrinsic viscosity (which method is hereinafter referred to as the "TPA PTT process"), such as that described in U.S. Pat. No. 6,403,762; an all melt process which comprises esterification of 1,3-propanediol (PDO) and terephthalic acid (TPA) to produce an esterification product, followed by prepolymerisation of the esterification product to form a prepolymer and final polycondensation of the prepolymer to produce PTT (which method is hereinafter referred to as the "all melt PTT process"), such as that described in U.S. Pat. No. 6,509,438; and, a process for producing PTT from 1,3-propanediol and dimethyl terephthalate (DMT) (which method is hereinafter referred to as the "DMT PTT process"), such as that described in JP-A-51-142097 or U.S. Pat. No. 5,340,909.

The process of the present invention comprises the addition of a small quantity of protic acid, as described herein, in the process for producing polytrimethylene terephthalate. The stage of the process for producing polytrimethylene terephthalate at which the protic acid is added has a direct effect on the amount of dipropylene glycol comonomer units present in the final PTT product. The protic acid must be included before and/or during the one or more esterification steps of the process. Included in the term "esterification step" as used herein is the trans-esterification step which occurs on reacting an alkyl diester of terephthalic acid with 1,3-propanediol. Where the process for producing polytrimethylene terephthalate involves more than one esterification step, it is preferred that the protic acid is added before and/or during the first esterification step. Addition of the protic acid before and/or during the first esterification step of the process results in the most significant increase in the amount of dipropylene glycol comonomer units present in the final PTT polymer. Addition of the protic acid into any subsequent esterification step of the process instead of the first esterification step results in an increase in the amount of dipropylene glycol comonomer units present in the final PTT polymer, however, the increase in dipropylene glycol comonomer units present in the final PTT product is lower than if the protic acid is added during the first esterification step of the process.

Addition of the protic acid during subsequent polycondensation steps of the process results in only minor increases in the amount of dipropylene glycol comonomer units present in the final PTT polymer compared with not including a protic acid in the process for making PTT. It is therefore desirable that the protic acid is included at the earliest possible stage of the process for producing polytrimethylene terephthalate.

In one embodiment of the present invention the protic acid may be added at more than one step in the process for producing polytrimethylene terephthalate, as long as the protic acid is incorporated before or into at least one esterification step. For example the protic acid may be added into the feed and also into a later esterification step. In such a case, the total amount of protic acid added into the process is in the range of from 0.001 to 10 millimole equivalents of acid per kilogram of polytrimethylene terephthalate produced.

The method by which the protic acid is included in the process for producing polytrimethylene terephthalate is not critical. Examples of methods by which the protic acid may be included in the process include: addition in the 1,3-propanediol monomer feed; addition in the terephthalic acid monomer or alkyl diester of terephthalic acid monomer feed; addition in a 1,3-propanediol/terephthalic acid paste feed; separate addition of the pure protic acid into the esterification vessel; separate addition into the esterification vessel in a 1,3-propanediol, terephthalic acid or alkyl diester of terephthalic acid solution or a solution of a mixture of two or all of these; and, when an esterification catalyst is used, combined addition of the esterification catalyst and protic acid either in solution added separately to the reaction vessel or added to a monomer feed.

If the protic acid is added into the PDO feed or PDO/TPA paste feed before being introduced into the esterification vessel, this can in itself lead to the formation of DPG. The resultant mixture may then be used in the one or more esterification steps. This is an alternative method for increasing the level of DPG in the final PTT product. Hence according to another aspect of the present invention, there is provided a process for the production of polytrimethylene terephthalate (PTT), comprising:

(a) contacting a protic acid other than terephthalic or isophthalic acid with 1,3-propanediol to form a mixture of 1,3-propanediol and dipropylene glycol (DPG);

(b) contacting the mixture of 1,3-propanediol and dipropylene glycol prepared in step (a) with terephthalic acid or an alkyl diester of terephthalic acid to produce polytrimethylene terephthalate via one or more esterification steps and one or more subsequent polycondensation steps;

wherein the protic acid has a dissociation constant of at most 4 ($pK_a$ measured in water at 25° C.), and wherein the protic acid is present in an amount in the range of from 0.001 to 10 millimole equivalents of acid groups per kilogram of polytrimethylene terephthalate produced.

The protic acid of the present invention may also be included by a combination of more than one method of addition.

As mentioned above, the process of the present invention may be applied to various methods for producing PTT, for example, the all melt process, the TPA PTT process and the DMT PTT processes. Each of these processes comprises one or more esterification steps and one or more subsequent polycondensation steps, and in accordance with the present invention, the protic acid is added before and/or during the one or more esterification steps. Details of these processes can be found in U.S. Pat. No. 6,509,438, U.S. Pat. No. 6,403,762 and U.S. Pat. No. 5,340,909 and Japanese patent JP-A-51-142097 incorporated herein by reference. These three types of processes are outlined below.

The All Melt Process

The process of the present invention is preferably applied to an all melt PTT process. The all melt PTT process can be conveniently described by reference to an esterification stage, a prepolymerization stage, and a final polycondensation stage. The process can be carried out in batch or continuous mode. Each step can be carried out in multiple stages in a series of reaction vessels, if desired, for optimum efficiency in the continuous mode or for product quality. Each step is preferably carried out in the absence of oxygen. The following will describe the process in terms of the preferred continuous mode.

In the all melt process, careful regulation of conditions in the esterification stage is critical to the production of a high intrinsic viscosity (IV) PTT without the necessity of a solid state polymerization step. The important conditions are believed to be the instantaneous concentration of 1,3-propanediol monomer (and TPA monomer) in the reaction mass, which is affected by the reaction pressure, reaction temperature, and monomer addition rate. These conditions are controlled so as to maximize the intrinsic viscosity (IV).

In the esterification stage, the instantaneous concentration of unreacted 1,3-propanediol in the reaction mass is maintained relatively low. This is accomplished by regulation of pressure and monomer feed. 1,3-propanediol and terephthalic acid are fed to a reaction vessel in a total feed molar ratio within the range of 1.15:1 to 2.5:1. Selection of the PDO:TPA ratio within this preferred relatively narrow range is a factor in achieving the desired product quality. In batch reactions, this is difficult to calculate. It is controlled by the paste feed molar ratio which is generally lower, i.e. 1.15:1 to 1.4:1. It is also preferred to add the 1,3-propanediol and terephthalic acid gradually so as to allow time to allow the conversion to ester to take place and keep the PDO and TPA concentrations low.

Also, to maintain the desired instantaneous concentration of 1,3-propanediol a relatively low reaction pressure should be maintained in the esterification stage. Conventional polytrimethylene terephthalate processes employ pressures greater than atmospheric to promote reaction between the monomers and to eliminate the need for an esterification catalyst. To make the present invention composition, the esterification reaction pressure is preferably maintained below 300 kPa (3 bar) absolute, generally within the range of 70 to 150 kPa (0.7 to 1.5 bar). Because 1,3-propanediol boils at about 214° C. at atmospheric pressure and the esterification reaction is conducted at 240° C. and above, the esterification conditions permit efficient removal of excess or unreacted 1,3-propanediol from the reaction medium. The temperature of the esterification step is maintained as low as reasonably possible, generally within the range of 240 to 270° C. The time of the esterification stage will typically range from 1 to 4 hours. Water is produced as a by-product of esterification and is removed by suitable means such as overhead distillation.

An esterification catalyst is optional but preferred in an amount of 5 ppm to 100 ppm (metal), preferably 5 ppm to 50 ppm, based on the weight of final polymer. Because of the desirable lower temperatures under which the esterification is carried out, the esterification catalyst will be of relatively high activity and resistant to deactivation by the water byproduct of this step. The currently preferred catalysts for the esterification step are titanium and zirconium compounds, including titanium alkoxides and derivatives thereof, such as tetra(2-ethylhexyl)titanate, tetrastearyl titanate, diisopropoxy-bis(acetylacetonato)titanium, di-n-butoxy-bis(triethanolaminoato)titanium, tributyl monoacetyltitanate triisopropyl monoacetyl-titanate and tetrabenzoic acid titanate; titanium complex salts such as alkali titanium oxalates and malonates, potassium hexafluorotitanate and titanium complexes with hydroxycarboxylic acids such as tataric acid, citric acid or lactic acid, catalysts such as titanium dioxide/silicon dioxide coprecipitate and hydrated alkaline-containing titanium dioxide; and the corresponding zirconium compounds. Catalysts of other metals, such as antimony, tin and zinc, can also be used.

The currently preferred catalyst for esterification, prepolymerization, and polycondensation is titanium tetrabutoxide. The catalyst is preferably formulated and added to the monomer feed, prior to or during the esterification, as a dilute liquid solution in 1,3-propanediol. This catalyst feed will preferably contain 5 wt % or less titanium.

The esterification stage can be carried out in one or more esterification steps in a single or multiple vessels, with catalyst addition in or between any esterification step as desired to provide a total added metal catalyst within the range of 20 to 250 ppm, preferably 25 to 100 ppm, based on final polymer. For example, a two-step esterification stage would include a first step carried out at about atmospheric pressure or a little above followed by a second step at or below atmospheric pressure. The temperature is 240 to 270° C. In such a two-step esterification process, a liquid catalyst feed could be introduced in each step. In the first steps, a catalyst feed of 5 to 50 ppm titanium can be introduced as a paste with the monomer feed. The first-step reaction is continued until 90 to 95% of the terephthalic acid is consumed. For the second step, an additional 20 to 150 ppm titanium may be injected, the pressure is maintained in the range of 50 to 120 kPa (0.5 to 1.2 bar), preferably near atmospheric, and the reaction is continued until consumption of 97 to 99% of the terephthalic acid. In a continuous process, the esterification steps would be carried out in separate reaction vessels.

The conditions of the one or more esterification steps are selected so as to produce a low molecular weight oligomeric product having an intrinsic viscosity (IV) of less than about 0.2 dl/g (measured in 60/40 phenol/tetrachloroethane at 30° C.), usually within the range of from 0.05 to about 0.15 dl/g.

In the prepolymerization step, the pressure on the esterification product mixture is reduced to less than 20 kPa (200 mbar), preferably to 0.2 to 20 kPa (2 to 200 mbar), and the temperature is maintained within the range of 250 to 270° C. Excess 1,3-propanediol and byproduct water are removed overhead. The time required for this step will generally be less than 2 hours. The product will have an intrinsic viscosity within the range of 0.15 to 0.40 dl/g (corresponding to a degree of polymerization of 10 to 30). The prepolymerization step, particularly in the continuous mode, is preferably carried out in two vacuum stages, with the initial stage between 5 and 20 kPa (50 and 200 mbar) and the second stage between 0.2 and 2 kPa (2 and 20 mbar). The prepolymerization process is preferably carried out in the presence of a prepolymerization catalyst, preferably a titanium or zirconium compound, such as those discussed above in relation to the esterification step, because of the high activity of these metals.

For the final polycondensation step of the all melt process, the reaction mixture is maintained under vacuum, preferably within the range of 0.02 to 0.25 kPa (0.2 to 2.5 mbar), and at a temperature within the range of 250 to 270° C. In general, the final polycondensation step will require 1 to 6 hours to reach the desired molecular weight, with shorter reaction times preferred to minimize the formation of colour bodies.

The final polycondensation step is most suitably carried out in a high surface area generation reactor capable of large vapour mass transfer, such as a cage-type, basket, perforated disk, disk ring or twin screw reactor. Optimum results are achievable in the process from the use of a cage type reactor or disk ring reactor, which promote the continuous formation of large film surfaces in the reaction product and facilitate evaporation of excess 1,3-propanediol and polymerization by-products.

The final polycondensation process is carried out in the presence of a polycondensation catalyst, preferably a titanium or zirconium compound, such as those discussed above in relation to the esterification step, because of the high activity of these metals. The currently preferred polycondensation catalyst is titanium butoxide, preferably present in an amount within the range of 25 to 100 ppm titanium.

The all melt process may optionally include the addition of stabilizers, colouring agents, and other additives for polymer property modification. Specific additives include delustering agents such as titanium dioxide; colouring agents such as cobalt acetate or organic dyes; stabilizers such as phosphorus compounds and hindered phenols; branching agents such as polyfunctional carboxylic acids, polyfunctional acid anhydrides, polyfunctional alcohols, and carboxyphosphonic acids or esters thereof.

The final PTT polymer prepared by the all melt process has an intrinsic viscosity (IV) of at least 0.6 dl/g, preferably 0.7 dl/g or greater, most preferably 0.8 dl/g or greater, and for some applications, preferably within the range of 0.9 to 1.3 dl/g, as measured in a solution of 0.4 g polymer in 100 ml of a 60:40 solution of phenol:tetrachloroethane at 30° C. (or as a dilute solution in another solvent such as hexafluoroisopropanol, and converted by known correlation to the corresponding IV in 60:40 phenol:tetrachloroethane).

In the all melt process, the protic acid of the present invention is added before and/or during one or more esterification steps of the process. In the embodiments of the all melt process which comprise more than one esterification steps, it is preferred that the protic acid is added before and/or during the first esterification step, preferably to the PDO and/or TPA feed. When process includes the addition of stabilizers, colouring agents, and other additives for polymer property modification, the protic acid may be included concurrently with these other additives.

The TPA PTT Process

The TPA PTT process is a two-stage condensation polymerization process. The first stage is melt polymerization and the second stage is solid state polymerization.

The first step of the melt polymerization stage of the TPA PTT process is an esterification step wherein a molar excess of 1,3-propanediol is reacted with terephthalic acid, usually in the absence of added catalyst, at temperatures within the range of about 230 to 270° C. under a super-atmospheric pressure within the range of about 30 to about 80 psia. The esterification product is a mixture of oligomers of bis(3-hydroxypropyl) terephthalate (BHPT), with a degree of polymerization of 3 to 10. During esterification, byproduct water is continuously removed from the reactor.

The second step of melt polymerization is the polycondensation step, wherein the pressure on the reaction mixture is reduced and a polycondensation catalyst is added. The preferred polycondensation catalysts are compounds of titanium, antimony, or tin, such as titanium butoxide, present in an amount within the range of 10 to 400 ppm titanium, antimony, or tin, based on the weight of the polymer. The low molecular weight product of the esterification or trans-esterification step is heated in this polycondensation step at a temperature within the range of about 240 to 300° C. under a vacuum for a time sufficient to increase the IV of the polycondensate to at least about 0.25 dl/g (equivalent to number average molecular weight of 4,300), while the major byproduct of polycondensation, PDO, is removed.

The product of the previous step is pelletized, using a strand pelletizer, an underwater pelletizer, or a drop-forming device, and then transferred to a solid state polymerization section in order to further polymerize the polymer to increase the intrinsic viscosity to the desired level.

The final PTT polymer produced by the TPA PTT process may also optionally include the addition of stabilizers, colouring agents, and other additives for polymer property modification, such as those described in the all melt process.

The DMT PTT Process

It is also possible to produce PTT via an esterification reaction between an alkyl diester of terephthalic acid (e.g. dimethylterephthalte (DMT)) and 1,3-propanediol. In such a process, the present inventors have found that it is possible to control the DPG content of the final PTT polymer by adding small amounts of a protic acid as defined hereinabove, wherein the amount of protic acid is in the range of from 0.001 to 10 millimole equivalents of acid per kilogram of polytrimethylene terephthalate produced, preferably in the range of from 0.001 to 5 millimole, more preferably from 0.005 to 5 millimole and most preferably from 0.005 to 2 millimole of acid per kilogram of polytrimethylene terephthalate produced. Alternatively, in a DMT PTT process, small amounts of terephthalic acid or isophthalic acid can be used before and/or during the one or more esterification steps instead of the protic acid to increase levels of DPG in the final PTT polymer. Hence, according to another aspect of the present invention there is provided a process for the production of polytrimethylene terephthalate (PTT), wherein the process comprises one or more esterification steps, wherein an alkyl diester of terephthalic acid is reacted with 1,3-propanediol (PDO), and one or more subsequent polycondensation steps, wherein the process further comprises the addition of terephthalic or isophthalic acid before and/or during the one or more esterification steps, and wherein the terephthalic or isophthalic acid added before and/or during the one or more esterification steps is in the range of from 0.1 to 1000 millimole equivalents of acid per kilogram of polytrimethylene terephthalate produced.

When using DMT to produce PTT, it is possible to add the small amount of protic acid to the PDO feed before the esterification step rather than during the esterification step. However, when terephthalic acid or isophthalic acid are used to increase the level of DPG in the DMT PTT process, it is preferred that the terephthalic acid or isophthalic acid are not added before the esterification step.

The DMT PTT process may be performed in a similar manner to the TPA PTT process and the all melt process, except that the terephthalic acid monomer is substituted for an alkyl diester of terephthalic acid, in particular dimethyl terephthalate (DMT). In the DMT PTT process, the first step is a trans-esterification (esterification step) of 1,3-propanediol and the alkyl diester of terephthalic acid in the presence of a suitable trans esterification catalyst, such as zinc acetate, magnesium acetate, or titanium alkanoate, at temperatures within the range of about 180 to about 250° C. under near atmospheric pressure. The trans esterification generates an alcohol, specifically methanol when DMT is used, as the byproduct, which is continuously distilled off.

In the DMT PTT process, it is preferred that the protic acid of the present invention is included before or during the one or more esterification steps of the process. In the embodiments of the DMT PTT process which comprise more than one esterification step, it is preferred that the protic acid is included before or during the first esterification step.

The final polytrimethylene terephthalate product produced by the process of the present invention will contain an increased amount of dipropylene glycol comonomer units. Preferably, the increase in the DPG level (mole %) in the final PTT polymer is at least 0.01 mole %, more preferably at least 0.05 mole %, even more preferably at least 0.1 mole %. Preferably, the increase in the DPG level (mole %) in the final PTT polymer is at most 10.0 mole %, more preferably at most 5.0 mole %, even more preferably at most 2.5 mole %, in comparison to the amount of dipropylene glycol comonomer units that would have been present had the small quantity of protic acid not been present in the process of production of polytrimethylene terephthalate.

The amount of dipropylene glycol comonomer units present in the final polytrimethylene terephthalate product produced by the process of the present invention will preferably be in the range of from 0.6 to 4.0 mole %, more preferably in the range of from 1.0 to 3.5 mole %, and most preferably in the range of from 1.1 to 3.0 mole %.

The process of the present invention will now be illustrated by the following non-limiting examples.

EXAMPLES

Example A (Comparative)

A 5 litre reactor equipped with a helical stirrer, hot oil heating, distillation column and vacuum capability was charged with 1934 g of terephthalic acid (TPA), 0.6 g Irganox 1076 stabilizer (commercially available from Ciba), 8.5 g of a 1,3-propanediol (PDO) solution containing cobalt acetate and silicon antifoam agent (commercially available from Dow Corning) (15 ppm Co based on weight of final polymer and 0.5 ppm antifoam agent based on weight of final polymer), 2.0 g of a PDO/acetic acid solution of titanium butoxide catalyst (15 ppm Ti based on weight of TPA) (commercially available from Aldrich Chemical) and 1131 g of PDO.

The esterification step was conducted by pressurizing the reactor to about 30 psig (1551 torr), stirring at about 150 rpm and heating to 255–260° C. for a total of about 120–140 minutes while distilling off the water produced in the reaction and some of the excess PDO. The reactor was returned to atmospheric pressure and an additional 8.8 gm of the titanium butoxide catalyst solution (65 ppm Ti based on TPA) was added. The prepolymerization step was conducted at about 260° C. and the pressure was gradually reduced to 40 torr over 30 minutes and held for an additional 15 minutes. The final polycondensation step was conducted at about 255° C. at about 100 rpm and the pressure was reduced from 40 torr to about 1 torr over 30 minutes and then further reduced to maximum vacuum over 15 minutes and held for about 210 minutes ("maximum vacuum" was about "zero" according to the pressure transducer but the actual pressure was estimated to be about 0.3 torr). At both the prepolymerization and final polycondensation steps, additional PDO and water are distilled overhead.

At the end of the final polycondensation step, the stirrer was stopped, the reactor pressurized to about 5–10 psi (258–517 torr), and the molten polymer was discharged from the reactor through a heated die into a water bath and pelletized. The intrinsic viscosity measured on a sample taken at about 15 minutes after beginning of pelletization was 0.71 (reported as IV in 60/40 tetrachloroethane/phenol at 35° C.). Proton NMR analysis (Varian Inova-500 spectrometer using a standard 30 degree tip pulse-and-acquire sequence, 8 KHz spectral width, 64K buffer, 5 sec delay, 64 scans) showed that the final polymer contained 2.7 mole % (1.5 wt %) of DPG units and ~2.4 wt. % cyclic dimer.

Examples 1 to 3

Examples 1 to 3 were performed in the same way as for Comparative Example A, except that the protic acid, para-toluenesulfonic acid monohydrate (p-TSA) (commercially available from Aldrich Chemicals), was included in the esterification step of the process. The solid p-toluenesulfonic acid was added along with the initial charge of TPA and PDO into the reactor. The intrinsic viscosity and the amount of p-TSA added is indicated in Table 1. The amount of DPG comonomer units present in the final PTT product is indicated in Table 1.

TABLE 1

| | p-TSA | | | DPG | | |
|---|---|---|---|---|---|---|
| Example | g | ppm | mmole/Kg PTT* | IV g/dL | mole %** | DPG wt % |
| A | 0 | 0 | 0 | 0.71 | 2.7 | 1.5 |
| 1 | 0.024 | 10 | 0.052 | 0.71 | 3.4 | 1.9 |
| 2 | 0.036 | 15 | 0.077 | 0.71 | 4.2 | 2.4 |
| 3 | 0.12 | 50 | 0.26 | 0.72 | 8.9 | 4.9 |

*based on 2.4 kg theoretical yield of PTT.
**based on the total number of moles of diol units.

Table 1 shows that the amount of DPG in the final PTT product is significantly increased when p-TSA is added to the esterification step (Examples 1–3) compared to when no p-TSA is added (Example A).

It can also be noted from Table 1, that the addition of the small quantity of protic acid in the process of production of polytrimethylene terephthalate results in an increase in the amount of dipropylene glycol comonomer units present in the polytrimethylene terephthalate which is proportional to the amount of protic acid added.

It can be noted from Table 1 that the IV (intrinsic viscosity) of the final PTT product is not noticeably affected by the inclusion of the protic acid in the process.

Also, the addition of p-TSA acid did not affect the concentration of the PTT cyclic dimer produced in the process. In all of the experiments shown here, the cyclic dimer in the isolated polymer was between 2.0 to 2.3 weight % which is within the experimental error of the NMR method employed (see Example A), estimated to be +/−0.1 wt %. Because cyclic dimer is a thermodynamic product, this result is not surprising.

Example B (Comparative)

Comparative Example B was carried out to show that the point at which the acid is added to the process is important. The polymerisation was conducted essentially as in Example 1, except that the para-toluenesulfonic acid monohydrate was added at the end of the esterification step and before the prepolymerisation step, instead of with the initial charge of TPA and PDO. The amount of DPG comonomer units present in the final PTT product was 2.8 mole % (=1.5 wt %), essentially the same level of DPG observed in Example A when no p-TSA is added, and significantly lower than the level of DPG observed in Example 1 when p-TSA is added with the initial charge (i.e. at the esterification stage).

Formation of DPG comonomer units after the esterification step is severely limited because the concentrations of PDO and PDO-endgroups are much lower than during the esterification.

We claim:

1. A process for the production of polytrimethylene terephthalate (PTT) having controlled levels of dipropylene glycol, comprising:
    (i) contacting 1,3-propanediol with terephthalic acid or an alkyl diester of terephthalic acid in the presence of a protic acid other than terephthalic acid or isophthalic acid having a dissociation constant (pKa) of at most 4, as measured in water at 25° C., to produce an esterification product in one or more esterification steps;
    (ii) polycondensing the esterification product to form polytrimethylene terephthate;
wherein the protic acid is present in the one or more esterification steps in an amount of from 0.001 to 10 millimole of protic acid per kilogram of polytrimethylene terephthalate produced.

2. The process of claim 1 wherein the protic acid is non-oxidising.

3. The process of claim 1 wherein the protic acid is non-nucleophilic.

4. The process of claim 1 wherein the protic acid is monofunctional.

5. The process of claim 1 wherein the protic acid is non-volatile.

6. The process of claim 1 wherein the protic acid does not degrade monomer or polymer units of the polytrimethylene terephthalate.

7. The process of claim 1 wherein the protic acid is an organosulfonic acid.

8. The process of claim 1 wherein the protic acid is a carboxylic acid.

9. The process of claim 1 further comprising the step of solid state polymerizing the polytrimethylene terephthalate produced by polycondensing the esterification product.

10. The process of claim 1 in which an esterification catalyst is contacted with the 1,3-propanediol and the terephthalic acid or alkyl diester of terephthalic acid in the esterification step.

11. The process of claim 1 wherein the concentration of dipropylene glycol comonomer in the polytrimethylene terephthalate product is from 0.6 to 4.0 mole percent.

12. A process for the production of polytrimethylene terephthalate (PTT) having a controlled level of dipropylene glycol, comprising:
    (i) contacting a protic acid other than terephthalic acid or isophthalic acid having a dissociation constant (pKa) of at most 4, as measured in water at 25° C., with 1,3-propanediol to form a mixture of 1,3-propanediol and dipropylene glycol;
    (ii) contacting the mixture of 1,3-propanediol and dipropylene glycol prepared in step (i) with terephthalic acid and/or an alkyl diester of terephthalic acid to produce an esterification product in one or more esterification steps; and
    (iii) polycondensing the esterification product to form polytrimethylene terephthalate;
wherein the protic acid is present in an amount of from 0.001 to 10 millimole equivalents of acid groups per kilogram of polytrimethylene terephthalate produced.

13. The process of claim 12 wherein the protic acid is non-oxidising.

14. The process of claim 12 wherein the protic acid is non-nucleophilic.

15. The process of claim 12 wherein the protic acid is monofunctional.

16. The process of claim 12 wherein the protic acid is non-volatile.

17. The process of claim 12 wherein the protic acid does not degrade monomer or polymer units of the polytrimethylene terephthalate.

18. The process of claim 12 wherein the protic acid is an organosulfonic acid.

19. The process of claim 12 wherein the protic acid is a carboxylic acid.

20. The process of claim 12 further comprising the step of solid state polymerizing the polytrimethylene terephthalate produced by polycondensing the esterification product.

21. The process of claim 12 in which an esterification catalyst is contacted with the 1,3-propanediol and the terephthalic acid or alkyl diester of terephthalic acid in the esterification step.

22. A process for the production of polytrimethylene terephthalate (PTT) having controlled levels of dipropylene glycol, comprising:
    (i) contacting 1,3-propanediol with an alkyl diester of terephthalic acid in the presence terephthalic acid to produce an esterification product in one or more esterification steps; and
    (ii) polycondensing the esterification product to form polytrimethylene terephthate;
wherein the terephthalic acid is present in the one or more esterification steps in an amount of from 0.01 to 1000 millimole equivalents of acid groups per kilogram of polytrimethylene terephthalate produced.

* * * * *